(12) United States Patent
Kobayashi

(10) Patent No.: US 6,172,782 B1
(45) Date of Patent: Jan. 9, 2001

(54) OUTPUT PORT SWITCHING DEVICE IN N-WDM SYSTEM

(75) Inventor: Kiyoto Kobayashi, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/079,555

(22) Filed: May 15, 1998

(30) Foreign Application Priority Data

May 15, 1997 (JP) .................................................. 9-124621

(51) Int. Cl.$^7$ ........................................................ H04J 4/00
(52) U.S. Cl. .......................... 359/128; 359/110; 359/128; 359/161; 359/133; 359/180; 359/187; 359/114; 359/115; 359/117; 359/127; 359/124; 370/219; 370/220
(58) Field of Search ..................................... 359/110, 128, 359/161, 133, 180, 187, 114, 115, 117, 127, 124; 370/219, 220

(56) References Cited

U.S. PATENT DOCUMENTS

| | | | |
|---|---|---|---|
| 4,989,199 | 1/1991 | Rzeszewski | 370/1 |
| 5,394,489 | * 2/1995 | Koch | 385/14 |
| 5,404,240 | * 4/1995 | Nishio et al. | 359/123 |
| 5,510,917 | * 4/1996 | Corke et al. | 359/110 |
| 5,623,356 | * 4/1997 | Kmaminow et al. | 359/123 |

FOREIGN PATENT DOCUMENTS 59-86929    5/1984   (JP) .

* cited by examiner

Primary Examiner—Jason Chan
Assistant Examiner—Sanjay Patel
(74) Attorney, Agent, or Firm—Scully, Scott, Murphy & Presser

(57) ABSTRACT

In an output port switching device in an N-WDM system, plural ports are switched by a change-over switch 18, and a backup light source path 19 linked to the change-over switch 18 has a wavelength-variable light source 23. A first multiplexer 14 wavelength-multiplexes plural optical signals output from the plural ports, and a trouble-occurring port monitoring mechanism portion 17 monitors occurrence of a trouble on the basis of an optical signal split from the output optical signal. The change-over switch 18 selects and switches an optical signal to which the trouble is detected, and the backup light source path 19 is controlled so that the wavelength thereof is substantially coincident with the wavelength of the optical signal to which the trouble is detected, and the optical signal thus controlled and the output optical signals of the first multiplexer are multiplexed by a second multiplexer 15.

10 Claims, 7 Drawing Sheets

OUTPUT PORT SWITCHING DEVICE IN N-WDM SYSTEM

BACKGROUND OF THE INVENTION (1) Field of the Invention

The present invention relates to an output port switching device in N-WDM (N-channel Wavelength Division Multiplexing) system, and for example, to an output port switching device in N-WDM system which is provided with a switching backup output port having a laser diode serving as a backup light source, and performs a control operation so that the wavelength of an optical signal emitted from the backup output port is coincident with the wavelength of an optical signal to be emitted from a trouble-occurring port.

(2) Description of the Related Art

Figure 4:
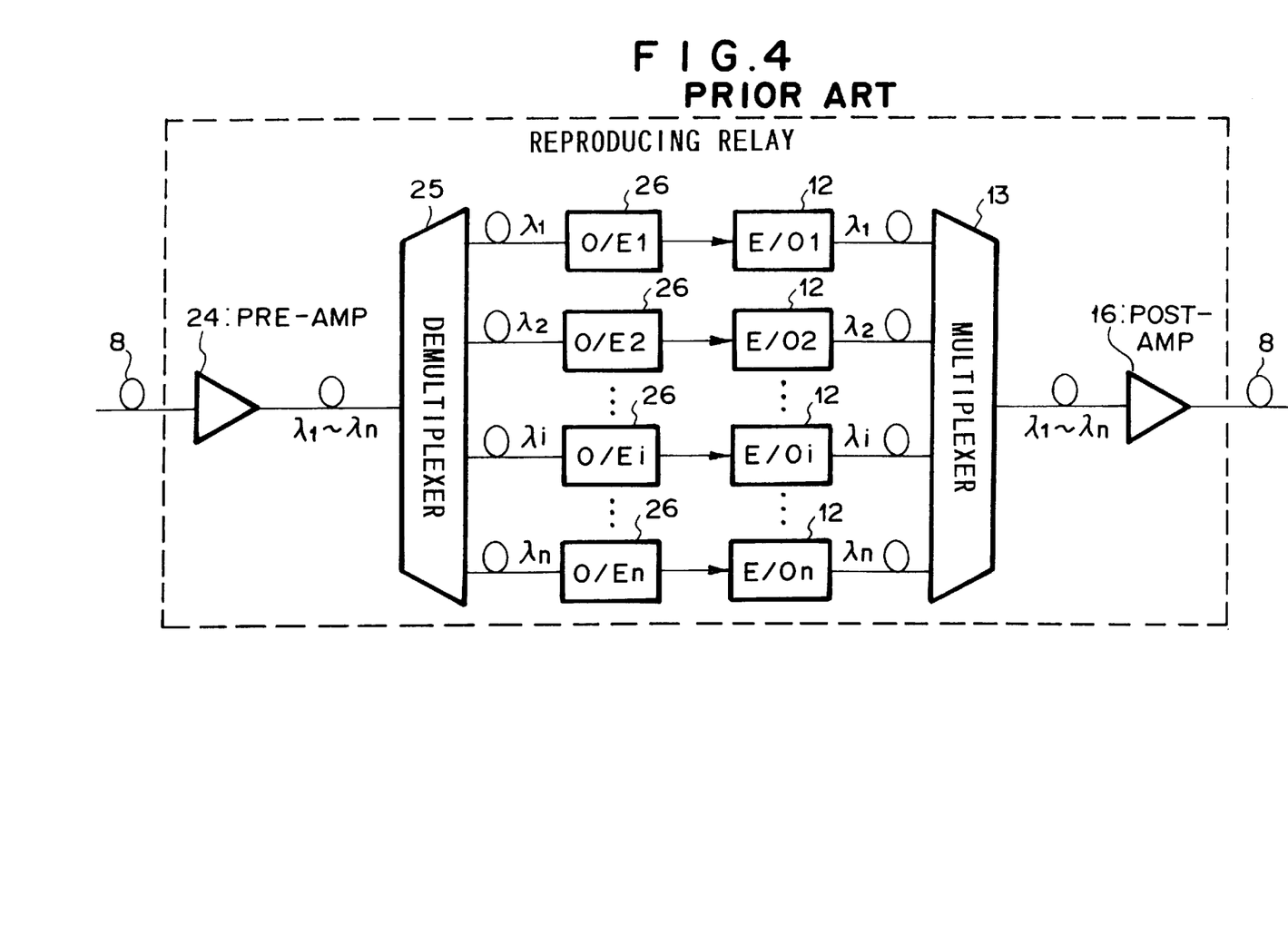
FIG. 4 is a block diagram showing the basis construction of an n-wave N-WDM device of a reproducing relay when there is no transmission line for switching in the prior art.
Figure 5:
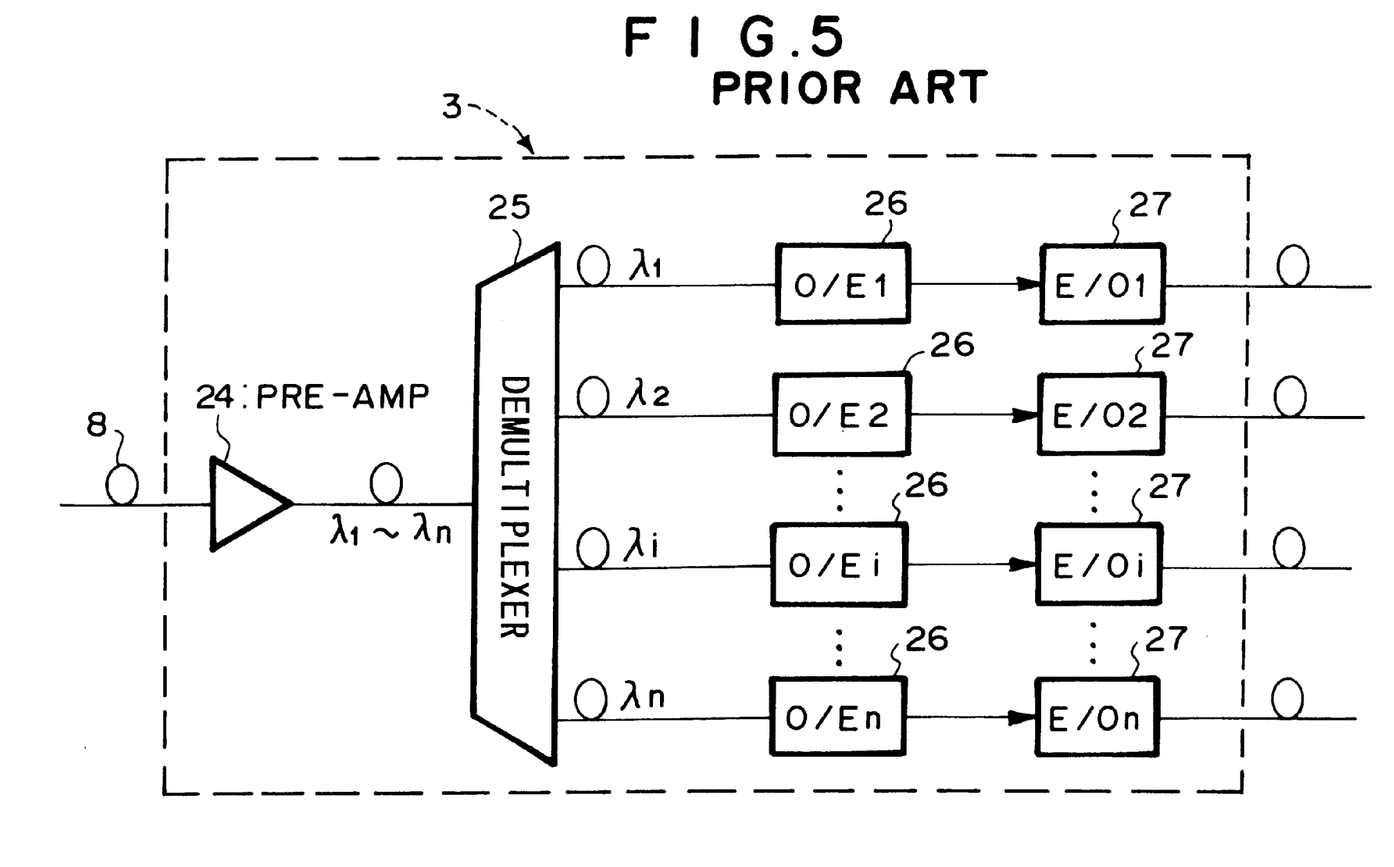
FIG. 5 is a block diagram showing the basic construction of an n-wave N-WDM device at a reception side when there is no transmission line for switching in the prior art.
Figure 6:
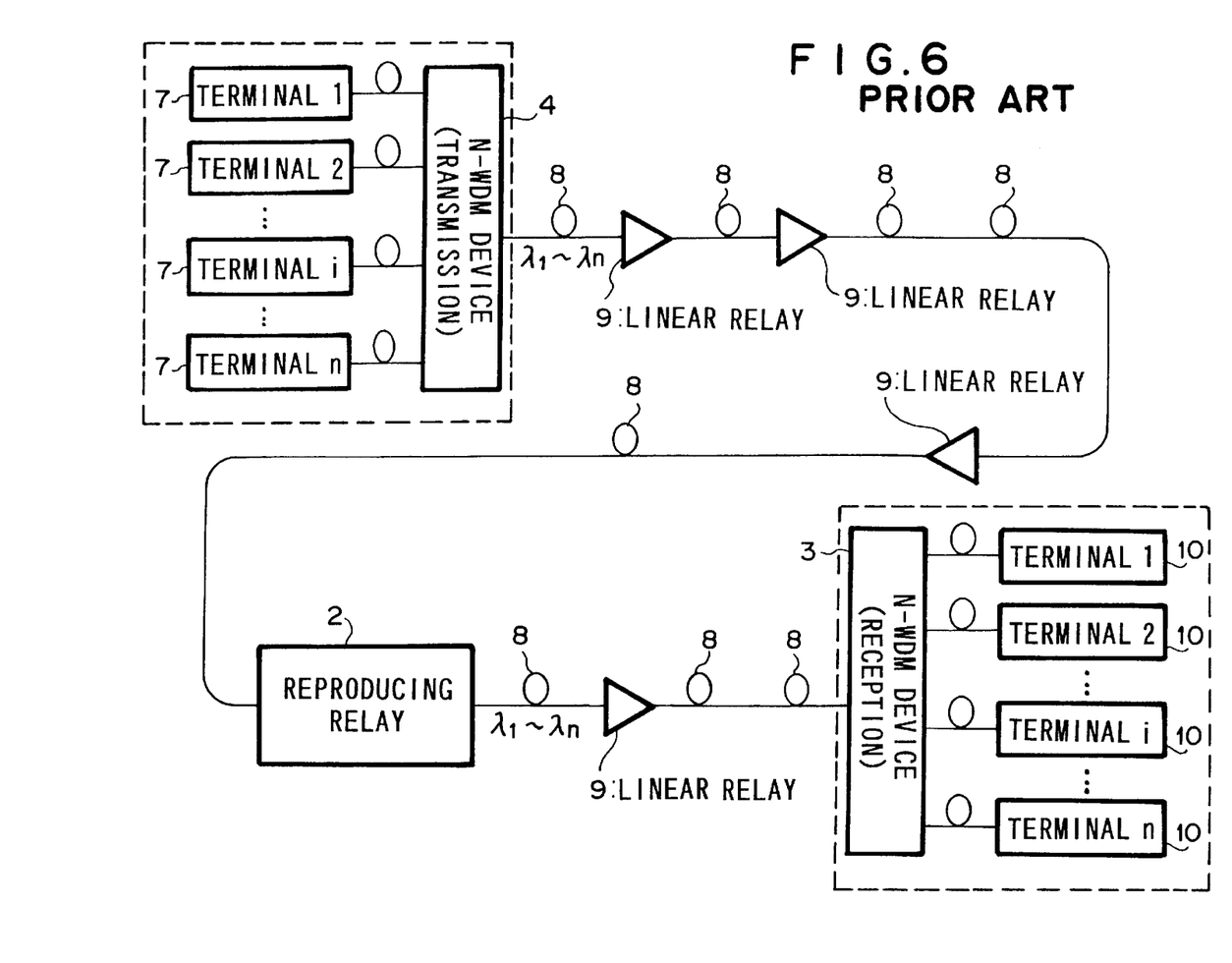
FIG. 6 is a block diagram showing the internal construction of a transmission device, a reception device and a reproducing relay which constitute the N-WDM system of the prior art 1.

A conventional output port switching device in N-WDM system is generally constructed as shown in FIGS. 3 to 6. That is, FIGS. 3 to 6 show the basic construction of n-waves N-WDM devices of a transmission side, a reproducing relay and a reception side respectively, and FIG. 6 is a block diagram showing the internal construction of a transmission device, a reception device and a reproducing relay which constitute an N-WDM system (prior art 1).

In FIGS. 3 to 6, the N-WDM transmission device 4 receives optical signals of n from terminals 7 at the respective ports of n, and temporarily converts each optical signal to an electrical signal by using an optical/electrical converter (O/E) 11. The electrical signals thus obtained are converted to optical signals of n having wavelengths $\lambda 1$ to $\lambda n$ again by using an electrical/optical converter (E/O) 12. The respective wavelengths are subjected to n-wave multiplexing by using a multiplexer 13. The n-wave multiplexed signal thus obtained is amplified to a predetermined output level by POST-AMP 16 as shown in FIG. 4, and then transmitted to an optical fiber transmission line 8.

The N-WDM reception device 3 receives the n-wave multiplexed signal which is weakened due to transmission loss as shown in FIG. 5, amplifies the input n-wave multiplexed signal by PRE-AMP 24, and then demultiplexes the amplified signal into optical signals of n having wavelengths $\lambda 1$ to $\lambda n$ by using a demultiplexer 25. Each split signal is converted to an electrical signal by O/E 26, then converted to an optical signal again by E/O 27, and then transmitted from each port to each terminal 10 as shown in FIG. 6.

The reproducing relay 2 used in a long-distance transmission system has such a structure that the portion extending from the input of the transmission line to O/E 26 in the reception device 3 is connected to the portion extending from E/O 12 to the output of the transmission line in the transmission device.

In the high-speed transmission line, it has been generally adopted to change a transmission line being used to a normal transmission line when some trouble occurs in the transmission line because if a trouble occurs in the transmission line, it brings a critical effect. In an optical transmission line, deterioration of an optical device such as a laser diode or the like at the transmission side is one factor which causes some trouble in the transmission line.

The N-WDM system in which optical signals having plural different wavelengths in the same wavelength band are subjected to wavelength division multiplexing needs laser diodes whose number is equal to at least the number of the wavelengths to be multiplexed, and this makes the trouble-occurring probability higher than that in a normal system which performs no wavelength division multiplexing. In addition, an optical device is higher in price than a normal electrical device, and thus provision of a backup transmission line for switching makes the cost higher than the normal system.

Further, in the general digital transmission line (not limited to the N-WDM system), when a switching operation to another backup transmission line is performed, the switching timing would be generally shifted, or even if the timing is matched, the frame synchronization at the reception side would be deviated due to a delay difference between the transmission lines, which causes such a trouble that a signal cutoff state occurs instantaneously.

Japanese Laid-open patent application no. sho-59-86929 (Prior Art 2) has proposed "Optical Transmission System" in order to solve the above problems. As disclosed in the prior art 2, a backup E/O having a wavelength $\lambda N$ different from the wavelengths of the other optical signals and a multiplexer are provided to the transmission side, and a backup O/E having a wavelength $\lambda N$ and a demultiplexer are provided to the reception side. In this publication, the switching operation of the transmission line is not performed, and the trouble-occurring wavelength is switched to the backup wavelength $\lambda N$.

Figure 7:
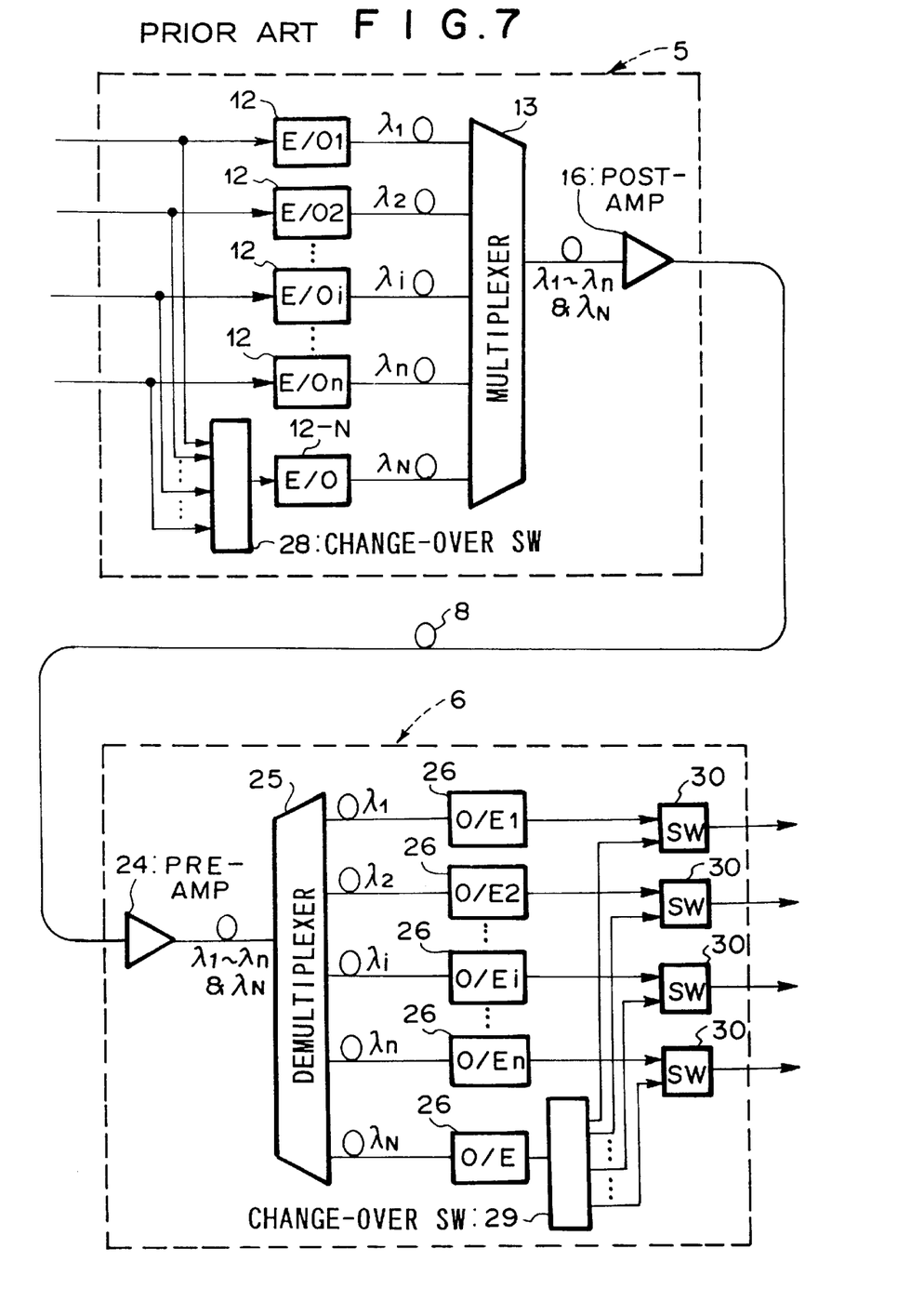
FIG. 7 is a block diagram showing the internal construction of a transmission device, a reception device and a reproducing relay which constitute the N-WDM system of the prior art 2.

FIG. 7 is a system block diagram showing the construction of the system of the prior art 2. In FIG. 7, the input of each port of the transmission device 5 is branched, and one input is directly input to E/O 12 while the other input is input to a change-over switch 28. For example when a trouble occurs in an i-th port of the transmission device 5 and transmission of a signal of wavelength $\lambda i$ is stopped, the change-over switch 28 selects the signal from the i-th port and transmits it to the backup E/O 12. The signal from the i-th port is converted to an optical signal of wavelength $\lambda N$. The optical signal thus converted is subjected to the wavelength division multiplexing together with the other normal signals by the multiplexer 13, and then transmitted to the transmission line.

In the reception device 6, the optical signal of wavelength $\lambda N$ is optoelectrically converted by O/E 26, and then input to a change-over switch 29. The change-over switch 29 connects the input signal to a non-instantaneous-cutoff switch 30. The non-instantaneous-cutoff switch 30 switches the output of the reception device 6 from a trouble-occurring signal to a signal transmitted through the backup light source.

However, the first problem of the prior art 1 resides in that the cost is high. Further, the prior art 2 has a lower cost than the transmission line switching system, however, a backup optical device must be provided to each of the transmission and reception devices. This is because the wavelength of the backup E/O of the transmission device is different from the wavelength of any optical signal under the normal state. Accordingly, in the system construction which needs a reproducing relay, backup E/O and O/E must be provided in the reproducing relay, and this makes the cost higher.

Further, there is a second problem in the use efficiency of the wavelength band and the wavelength interval between the optical signals which are subjected to the wavelength division multiplexing. That is, the number of times at which the wavelength division multiplexing operation of N-WDM is performed is continued to increase, and the wavelength interval must be shortened in order to increase the number of times of the multiplexing in a limited wavelength band. However, as the wavelength interval is reduced, the wavelength splitting (division) technique becomes more difficult. Therefore, it is required not to increase needless wavelengths even if it is only one wavelength.

SUMMARY OF THE INVENTION

An object of the present invention is to provided an output port switching device in N-WDM system which is low in cost and easily introduced without reducing the use efficiency of the wavelength band and without shortening the wavelength interval.

Figure 1:
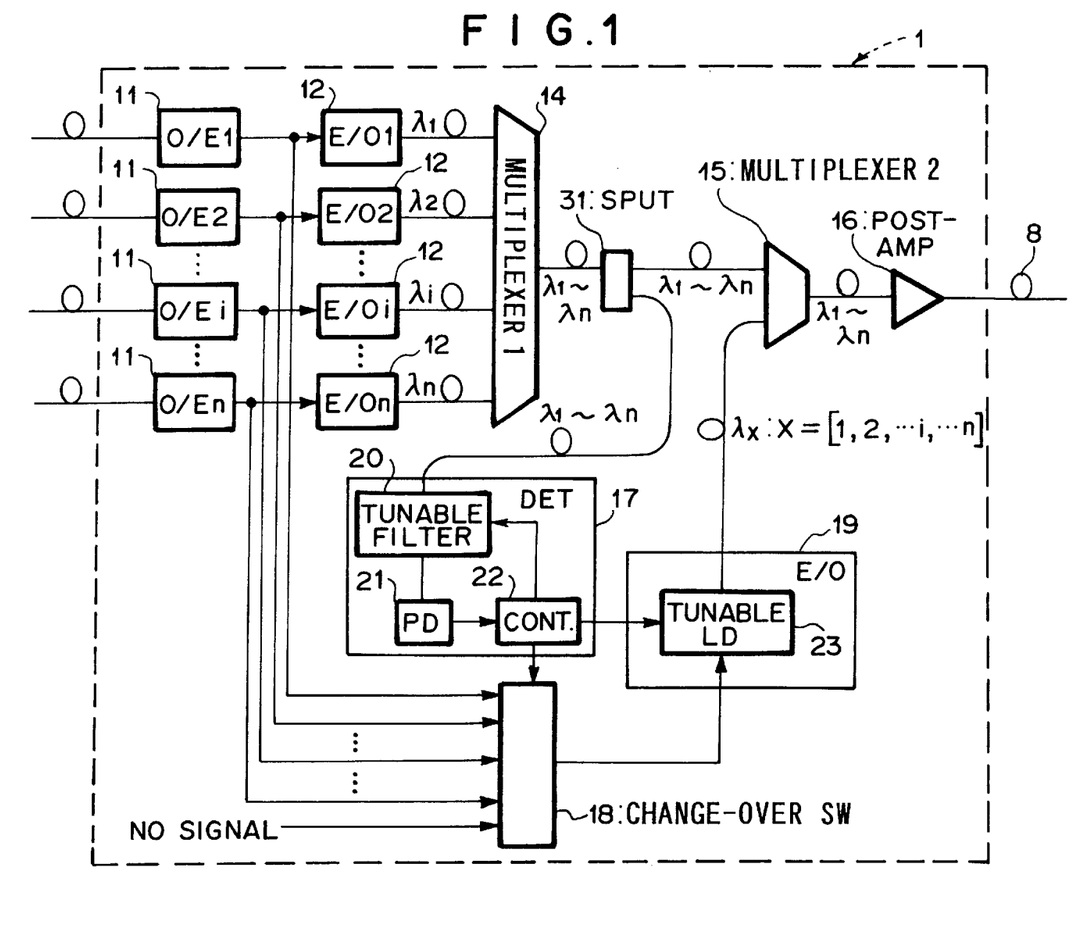
FIG. 1 is a block diagram showing the construction of an embodiment of an output port switching device in an N-WDM system according to the present invention.

In order to attain the above object, as shown in FIG. 1, an W output port switching device in an N-WDM system according to the present invention is characterized by including a change-over switch (18) for switching plural ports, a backup light source path (19) having a wavelength-variable light source which is linked to the change-over switch, a first multiplexer (14) for wavelength-multiplexing plural optical signals output from the plural ports, a trouble-occurring port monitoring mechanism portion (17) comprising a wavelength-variable filter (20) for monitoring the presence or absence of occurrence of a trouble on the basis of an optical signal branched from the output optical signal of the first multiplexer and a light amount detector (21), and a second multiplexer (15) for wavelength-multiplexing the output optical signal of the backup light source path (19) with the output optical signals of the other normal ports, wherein the change-over switch (18) selects and switches an optical signal to which some trouble is monitored by the trouble-occurring port monitoring mechanism portion (17), the backup light source path (19) is controlled so that the wavelength thereof is substantially coincident with the wavelength of the optical signal to which the trouble is detected, and the controlled optical signal and the output optical signal of the first multiplexer (14) are multiplexed by the second multiplexer (15).

The output port switching device of the N-WDM system may be constructed as a device at a transmission side.

Further, the trouble-occurring port monitoring mechanism portion (17) has a control circuit (22), and various control operations such as detection of troubles, the switching operation of the change-over switch (18), the control operation of the wavelength to the substantially coincident wavelength, etc. may be performed by the control circuit (22).

The output port switching device of the N-WDM system further includes a splitter (31) between the first multiplexer (14) and the second multiplexer (15), and the output optical signal of the first multiplexer (14) is split by the splitter (31), and one optical signal thus split is input to the second multiplexer while the other optical signal is input to the trouble-occurring port monitoring mechanism portion (17).

DETAILED DESCRIPTION OF THE PREFERRED EMBODIMENT

Figure 2:
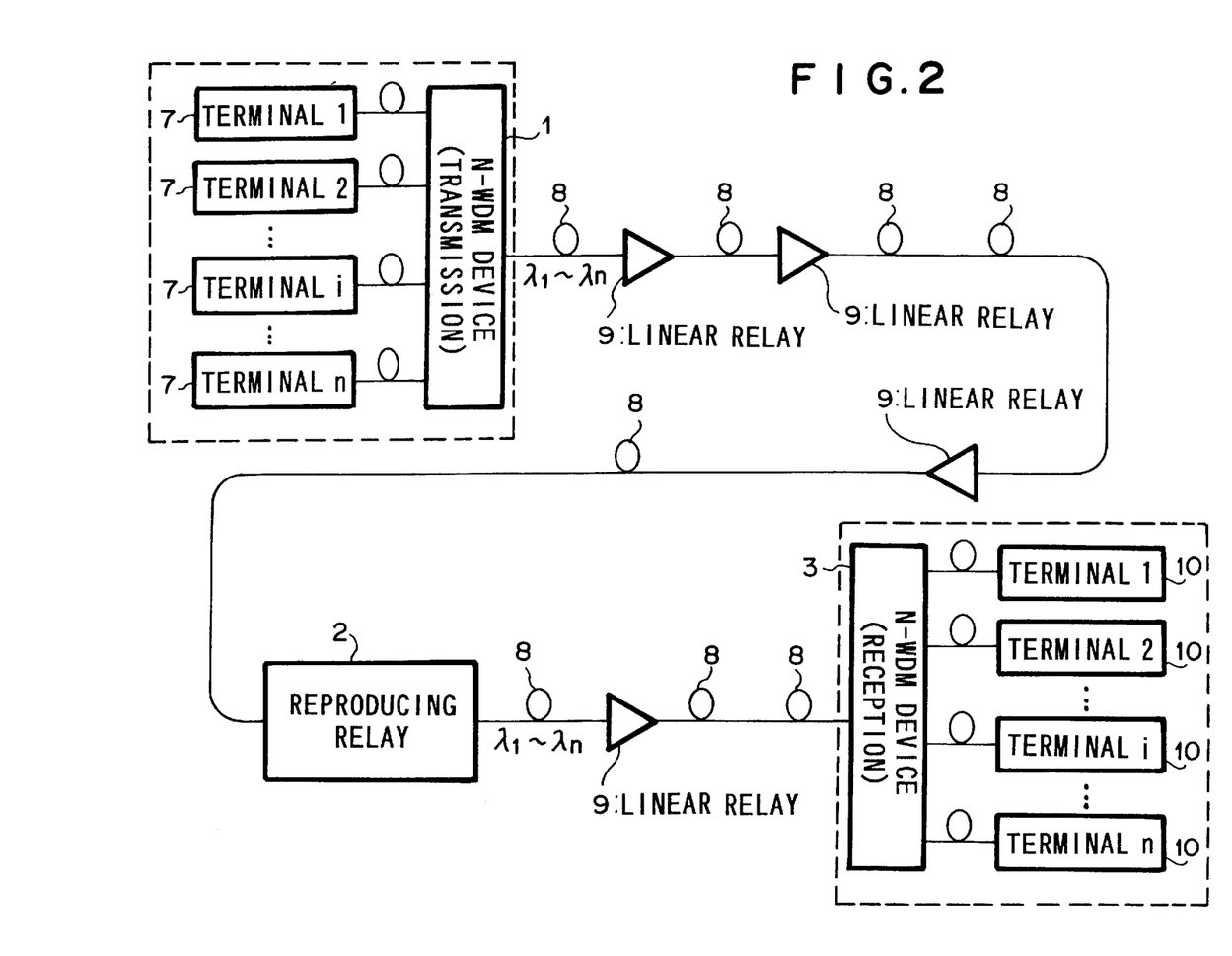
FIG. 2 is a diagram showing the construction of the N-WDM system to which the output port switching device of the N-WDM system of the embodiment is applied.
Figure 3:
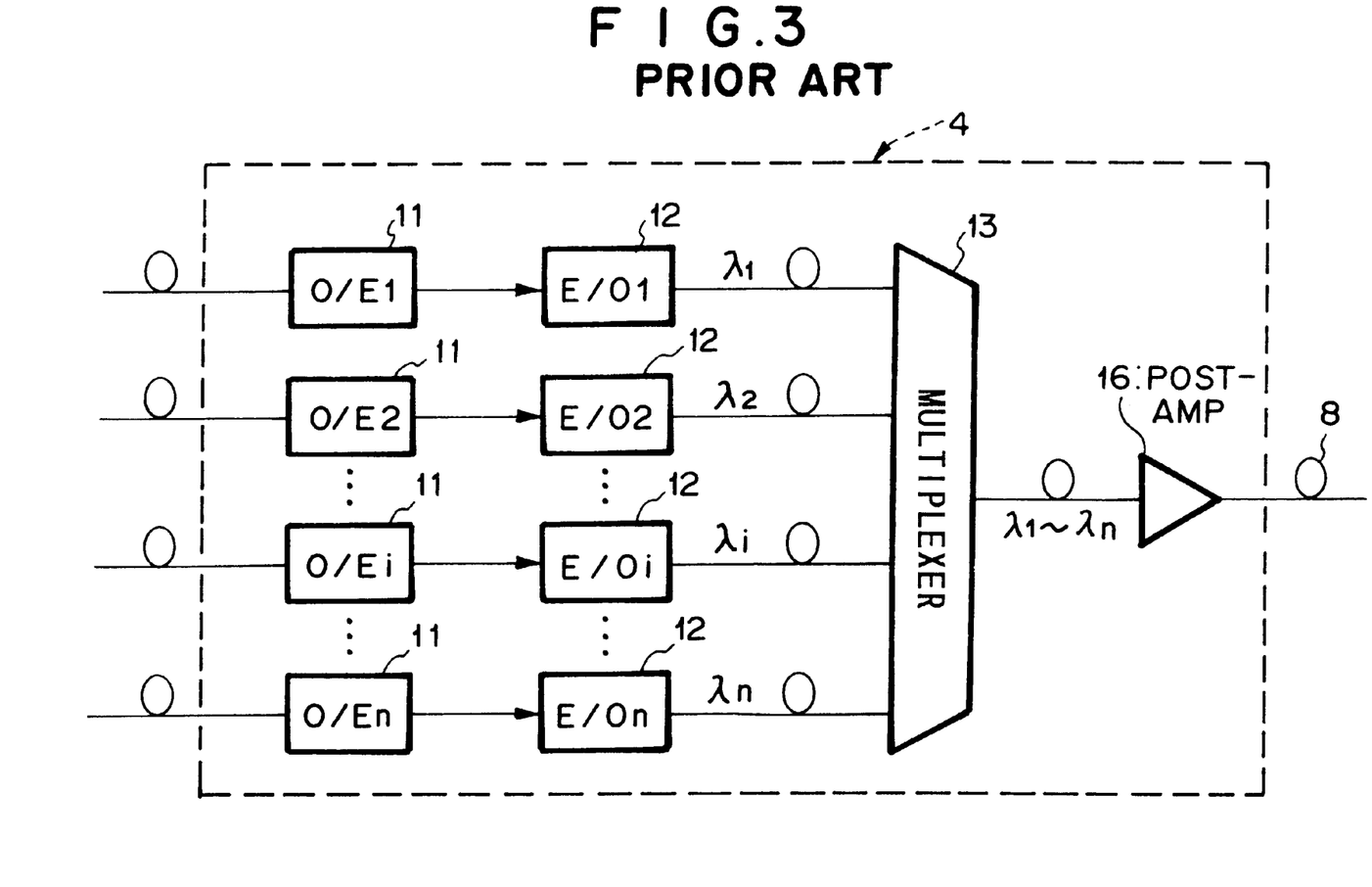
FIG. 3 is a block diagram showing the basic construction of an n-wave WDM device at a transmission side when there is no transmission line for switching in the prior art.

A preferred embodiment of an output port switching device in an N-WDM system according to the present invention will be described with reference to the accompanying drawings. An embodiment of the output port switching device in the N-WDM system according to the present invention is shown in FIGS. 1 and 2.

FIG. 1 is a block diagram showing the construction of an N-WDM transmission device 1 using the output port switching device according to the present invention. The output port switching device in the N-WDM system according to this embodiment is constructed as an N-WDM device 1 at a transmission side. The N-WDM transmission device 1 includes O/E (11) of n for converting optical signals to electrical signals, E/O (12) of n for converting the electrical signals to optical signals of n having wavelengths λ1 to λn, multiplexers 14 for multiplexing the optical signals of n into an n-wavelength multiplexed signal, a splitter (SPLIT) 31 for splitting the optical signal from the n-wavelength multiplexed signal, a detector (DET) 17 for detecting the presence or absence of occurrence of some trouble by using the split optical signal as a trouble monitoring signal, a change-over switch (SW) 18 for selecting and outputting one optical signal from optical signals of n, a backup light source path (E/O) 19, another multiplexer 2 (15), and POST-AMP 16 for outputting an amplified optical signal to an optical fiber transmission line 8.

The detector (DET) 17 comprises a wavelength-variable filter (TUNABLE FILTER) 20, a photodiode (PD) 21 serving as a light amount detector, and a control circuit (CONT) 22 for controlling the transmission wavelength of the wavelength-variable filter 20. The backup E/O 19 has a wavelength-variable laser diode (TUNABLE LD) 23 for emitting an optical signal whose wavelength is substantially coincident with the light wavelength input from the switch SW 18.

The optical signals of n which are received at the respective ports of the N-WDM transmission device 1 are temporarily converted to electrical signals of n respectively by O/E (11) of n. Each electrical signal thus converted is split into two electrical signals. The respective one electrical signals thus split are converted to optical signals having the wavelengths 11 to In by E/Os (12) of n, and then subjected to n-wavelength multiplexing by the multiplexer 14. The other electrical signals are passed through the change-over switch 18 and input to the backup E/O 19.

The n-wavelength multiplexed signal obtained by the n-wavelength multiplexing in the multiplexer 14 is split by the splitter (SPLIT) 31, and one optical signal thus split is input as the trouble-monitoring signal to the detector (DET) 17. The trouble monitoring signal thus input is passed through the wavelength-variable filter (TUNABLE FILTER) 20 in the detector (DET) 17, and then input to the photodiode (PD) 21 to detect the light amount.

The transmission wavelength of the wavelength-variable filter 20 is controlled by the control circuit (CONT) 22. Accordingly, if PD 21 does not detect a predetermined light amount of optical signal when the transmission wavelength is set to λi, it is known that some trouble occurs in the i-th port (i represents any one of 1 to n).

When the signal of the wavelength λi is cut off and some trouble is detected in the i-th port, CONT 22 controls the change-over switch 18 to select the signal of the i-th port and at the same time set the wavelength of the wavelength-variable laser diode (TUNABLE LD) 23 of the backup E/O (19) to λi. Accordingly, the signal of the i-th port is output at the wavelength λi from the backup E/O (19). This signal is wavelength-multiplexed with the optical signals from the other normal ports by the multiplexer 2 (15), amplified to a predetermined output level by POST-AMP 16 and then transmitted to the optical fiber transmission line 8.

FIG. 2 is a diagram showing the construction of the N-WDM system which is constructed by using the N-WDM transmission device 1 of this embodiment.

In FIG. 2, the optical signals of n from the terminals 7 of n are received at the respective ports of the N-WDM device 1 which is provided with the backup E/O (19) having a wavelength-variable LD. When an i-th signal is cut off or a trouble occurs in a port of the N-WDM device, the wavelength of the wavelength-variable laser diode PD 21 of the backup E/O (19) is controlled to be set to λi, and the signal of the i-th port of the optical fiber transmission line 8 is output at the wavelength λi. Accordingly, no special device is needed in the reception device and the reproduction relay.

When a linear relay line is disposed in the optical fiber transmission line and some trouble of a specific channel is detected in the reproducing relay 2 as in the case of the N-WDM device 1, the signal of the light wavelength thereof is detected, converted to the optical signal of the same channel, optically multiplexed and then output to the optical fiber transmission line 8. The signal from the optical fiber transmission line 8 is demodulated at each channel in the N-WDM reception device, and output to the respective terminals 10.

The output port switching device of the N-WDM system according to the embodiment uses the wavelength-variable light source as the backup light source of the N-WDM device at the transmission side. When some trouble occurs, the wavelength-variable light source is controlled so that the wavelength thereof is substantially coincident with the trouble-occurring wavelength. By controlling backup light source so that the wavelength of the backup light source of the transmission device side is substantially coincident with the wavelength of the trouble-occurring signal, it is unnecessary to mount backup O/E, E/O at the reception device side and the reproducing relay side. In addition, the signal use efficiency of the wavelength band is not lowered, and the wavelength interval of the respective wavelength-multiplexed signals is not narrowed.

The above embodiment is a preferred embodiment, however, the present invention is not limited to the above embodiment. Various modifications may be made to the above embodiment without departing from the subject matter of the present invention.

As is apparent from the foregoing description, the output port switching device in the N-WDM system according to the present invention uses the wavelength-variable light source which is linked after the plural ports are switched, the plural optical signals output from the plural ports are wavelength-multiplexed, and occurrence of the trouble is monitored on the basis of the optical signal split from the output optical signal.

The optical signal to which the trouble is detected is selected and switched, the wavelength-variable light source is controlled so that the wavelength thereof is substantially coincident with the wavelength of the trouble-occurring optical signal, and the output optical signal of the wavelength-variable light source is wavelength-multiplexed with the output optical signals of the other normal ports.

Accordingly, the present invention is implemented by adding the backup light source to only the transmission device of the N-WDM system, and the trouble correction can be performed in low cost. Further, the use efficiency of the wavelength band is not reduced, and the wavelength interval of the optical signals to be wavelength-multiplexed is not narrowed.

Although the present invention has been shown and described with respect to best mode embodiments thereof, it should be understood by those skilled in the art that the foregoing and various other changes, omissions, and additions in the form and detail thereof may be made therein without departing the spirit and scope of the present invention.

What is claimed is:

1. An output port switching device in an N-WDM (N-channel Wavelength Division Multiplexing) system with a switching backup output port having a laser generator serving a backup light source, comprising:
   a change-over switch (18) for switching plural ports having plural electric signal converted from plural optical signal by a optical/electrical converter;
   a backup light source path (19) having a wavelength-variable light source which is linked to the change-over switch;
   a first multiplexer (14) for wavelength-multiplexing plural optical signals output from said plural ports;
   a trouble-occurring port monitoring mechanism portion (17) comprising a wavelength-variable filter (20) for monitoring whether an occurrence of a trouble on the basis of an optical signal branched from the output optical signal of said first multiplexer and a light amount detector (21); and
   a second multiplexer (15) for wavelength-multiplexing the output optical signal of said backup light source path (19) with the output optical signals of the other normal ports,
       wherein said change-over switch (18) selects and switches an optical signal to which some trouble is monitored by said trouble-occurring port monitoring mechanism portion (17), said backup light source path (19) is controlled so that the wavelength thereof is substantially coincident with the wavelength of the optical signal to which the trouble is detected, and
       wherein the controlled optical signal and the output optical signal of said first multiplexer (14) are multiplexed by the second multiplexer (15).

2. The output port switching device of the N-WDM system as claimed in claim 1,
   wherein said output port switching device is constructed as a device at a transmission side.

3. The output port switching device of the N-WDM system as claimed in claim 2,
   wherein said trouble-occurring port monitoring mechanism portion (17) has a control circuit (22) for performing various control operations such as detection of troubles, the switching operation of said change-over switch (18), the control operation of the wavelength to the substantially coincident wavelength.

4. The output port switching device of the N-WDM system as claimed in claim 2, further including a splitter (31) between said first multiplexer (14) and said second multiplexer (15), wherein the output optical signal of said first multiplexer (14) is split by said splitter (31), and wherein one optical signal thus split is input to said second multiplexer while the other optical signal is input to said trouble-occurring port monitoring mechanism portion (17).

5. The output port switching device of the N-WDM system as claimed in claim 3, further including a splitter (31) between said first multiplexer (14) and said second multiplexer (15), wherein the output optical signal of said first multiplexer (14) is split by said splitter (31), and wherein one optical signal thus split is input to said second multiplexer while the other optical signal is input to said trouble-occurring port monitoring mechanism portion (17).

6. The N-WDM system as claimed in claim 2, wherein said trouble-occurring port monitoring mechanism portion (17) has a control circuit (22) for performing various control operations such as detection of troubles, the switching operation of said change-over switch (18), the control operation of the wavelength to the substantially coincident wavelength.

7. The N-WDM system as claimed in claim 6, further including a splitter (31) between said first multiplexer (14) and said second multiplexer (15), wherein the output optical signal of said first multiplexer (14) is split by said splitter (31), and wherein one optical signal thus split is input to said second multiplexer while the other optical signal is input to said trouble-occurring port monitoring mechanism portion (17).

8. An N-WDM (N-channel Wavelength Division Multiplexing) system with a switching backup output port having a laser diode serving as a backup light source, comprising:

a change-over switch (18) for switching plural ports having plural electric signal converted from plural optical signal by a optical/electrical converter ;

a backup light source path (19) having a wavelength-variable light source which is linked to the change-over switch;

a first multiplexer (14) for wavelength-multiplexing plural optical signals output from said plural ports;

a trouble-occurring port monitoring mechanism portion (17) comprising a wavelength-variable filter (20) for monitoring whether an occurrence of a trouble on the basis of an optical signal branched from the output optical signal of said first multiplexer and a light amount detector (21); and a second multiplexer (15) for wavelength-multiplexing the output optical signal of said backup light source path (19) with the output optical signals of the other normal ports, wherein said change-over switch (18) selects and switches an optical signal to which some trouble is monitored by said trouble-occurring port monitoring mechanism portion (17), said backup light source path (19) is controlled so that the wavelength thereof is substantially coincident with the wavelength of the optical signal to which the trouble is detected, and wherein the controlled optical signal and the output optical signal of said first multiplexer (14) are multiplexed by the second multiplexer (15).

9. The N-WDM system as claimed in claim 8, wherein said second multiplexer is constructed at a transmission side and a output optical signal wavelength-multiplexed is output to a optical fiber through a post-amplifier.

10. The N-WDM system as claimed in claim 9, further including a splitter (31) between said first multiplexer (14) and said second multiplexer (15), wherein the output optical signal of said first multiplexer (14) is split by said splitter (31), and wherein one optical signal thus split is input to said second multiplexer while the other optical signal is input to said trouble-occurring port monitoring mechanism portion (17).

* * * * *